Sept. 20, 1971  J. C. FITCH  3,606,258
ENERGY ABSORBING DECELERATION BARRIERS
Filed Jan. 2, 1969  7 Sheets-Sheet 1

INVENTOR.
JOHN C. FITCH
BY
Strauch Nolan Neale Nies+Kurz
ATTORNEYS

Sept. 20, 1971  J. C. FITCH  3,606,258
ENERGY ABSORBING DECELERATION BARRIERS
Filed Jan. 2, 1969  7 Sheets-Sheet 2

INVENTOR
JOHN C. FITCH

Strauch Nolan Neale Nies+Kurz
ATTORNEYS

Sept. 20, 1971   J. C. FITCH   3,606,258
ENERGY ABSORBING DECELERATION BARRIERS
Filed Jan. 2, 1969   7 Sheets-Sheet 3

INVENTOR
JOHN C. FITCH

BY
*Strauch Nolan Neale Nies + Kurz*
ATTORNEYS

Sept. 20, 1971  J. C. FITCH  3,606,258
ENERGY ABSORBING DECELERATION BARRIERS
Filed Jan. 2, 1969  7 Sheets-Sheet 4

INVENTOR
JOHN C. FITCH

BY
Strauch Nolan Neale Nies & Kurz
ATTORNEYS

Sept. 20, 1971  J. C. FITCH  3,606,258
ENERGY ABSORBING DECELERATION BARRIERS
Filed Jan. 2, 1969  7 Sheets-Sheet 5

INVENTOR
JOHN C. FITCH

BY
Strauch Nolan Neale Nies + Kurz
ATTORNEYS

Fig. 15

Sept. 20, 1971  J. C. FITCH  3,606,258
ENERGY ABSORBING DECELERATION BARRIERS
Filed Jan. 2, 1969  7 Sheets-Sheet 7

INVENTOR.
JOHN C. FITCH
BY
Strauch Nolan Neale Nies + Kurz
ATTORNEYS

United States Patent Office 3,606,258
Patented Sept. 20, 1971

3,606,258
ENERGY ABSORBING DECELERATION BARRIERS
John C. Fitch, Lime Rock, Lakeville, Conn., assignor to Fibco, Inc., Hartford, Conn.
Continuation-in-part of abandoned application Ser. No. 665,359, Sept. 5, 1967. This application Jan. 2, 1969, Ser. No. 788,890
Int. Cl. E01f 15/00
U.S. Cl. 256—13.1                                    9 Claims

ABSTRACT OF THE DISCLOSURE

Highway safety devices comprising an array of energy absorbing barrier units each preferably comprising a dispersible mass, effective, when struck by a vehicle, to bring the vehicle to rest at a rate of deceleration tolerable to the vehicle occupants without imposing an overturning or lifting moment on the vehicle.

RELATED APPLICATION

This application is a continuation-in-part of application Ser. No. 665,359, filed Sept. 5, 1967, now abandoned.

BACKGROUND OF THE INVENTION

This invention relates to highway safety devices and more particularly to such devices for decelerating uncontrolled or improperly controlled vehicles as they approach immovable obstructions such as bridge abutments or as they leave the highway at a point of particular danger.

As is well known, the matter of reducing the highway fatality and injury rate has been the subject of increasing attention in recent years. The matter of highway safety includes a number of factors such as the quality of the vehicle, the training, skill and experience of the driver, the highway system itself and the establishment and enforcement of intelligent safety laws. Limited progress is being made in all of these areas.

Studies have demonstrated that more than a third of fatal accidents involve only one vehicle. In the usual case the driver loses control of the vehicle which then leaves the road and often strikes a fixed obstruction unavoidably in position adjacent to the highway and which may be a part of the highway system itself such as a bridge abutment. In such a case the occupants of the vehicle can be protected only by controlling the rate of vehicle deceleration to reduce the risk of injury caused by the "second collision" which occurs when the occupants strike the interior of the vehicle.

Since the impact velocity of the vehicle is beyond control and its final velocity is zero, the risk of injury can be reduced only by increasing the distance through which the vehicle and its occupants are decelerated.

Proposals to incorporate crushable structure in the vehicle for this purpose have been, for the most part, unsuccessful. Because of practical limits in vehicle size the crush distance obtainable through the most sophisticated auto design is on the order of two feet and cannot exceed four or five feet in a practical automobile that can be built for a price acceptable to the purchasing public. Obviously a passenger car incorporating even two or three feet of lateral crush distance making the overall width of the vehicle 10 feet or more is not feasible. Similarly, it is not feasible to increase significantly the crush distance of the fixed obstructions which necessarily possess a high degree of rigidity.

Accordingly, it has been proposed to introduce sacrificial energy absorbing devices in the path of the vehicle adjacent to heavy fixed obstructions. Despite the need for such devices and their obvious advantages, insofar as presently known none have been accepted in any significant number either because of lack of efficiency, prohibitive cost or because in some cases they increase the hazard or become hazardous themselves. Examples of such prior proposals may be found in U.S. Pats. 2,088,087; 2,375,443; 3,141,655; 3,288,440, and 3,292,909.

Among the deficiencies of most, if not all, of these prior proposals is their tendency to substitute one uncontrolled motion for another, i.e., to deflect the vehicle into the path of an oncoming vehicle; to impose an overturning moment on the vehicle, to create a secondary hazard, i.e., where the energy absorbing devices themselves may be projected into the path of other vehicles, or to subject the vehicle and its occupants to severe deceleration forces.

The familiar guard rails of various types, median dividers, fences, and walls are "tangent deflection" devices intended to deflect any vehicle which strikes them tangentially. For the most part they are intended simply to change the direction of the vehicle without appreciably reducing its velocity or momentum. Since the tangent deflection devices are usually anchored and usually have greater rigidity than vehicles, they constitute in themselves further obstructions along the highway, especially when the ends of "tangent deflection" barriers are exposed to vehicle impingement. Then when they are struck by a vehicle travelling in a path at right angles or at a high angle to the barrier, the results are often as severe as when a vehicle strikes a bridge abutment or other fixed obstruction. This is because the "tangent deflection" barrier is, in these cases, being misused to perform the function of a "head-on" type of barrier. Most, if not all, of the prior barriers are by design intended to arrest or deflect the movement of the vehicle within a fixed, usually very short, distance regardless of the speed and weight of the vehicle. The result generally is the imposition of catastrophically high forces on the vehicle and the occupants.

SUMMARY OF THE INVENTION

With the foregoing considerations in mind, it is the principal purpose and object of the present invention to provide improved devices for decelerating vehicles which obviate the above-stated disadvantages of prior proposals and which provide for controlled deceleration of vehicles without the creation of the secondary hazards noted above.

It is a further object of the present invention to provide an array of barrier units of novel construction adapted to be positioned to intercept a vehicle moving toward an immovable object to progressively decelerate a vehicle by displacement or dispersion of all or a portion of the mass represented by the units.

It is a further object of the present invention to provide improved deceleration barriers which are effective to decelerate a vehicle at a controlled rate while imparting a horizontal or overturning-resisting force on the vehicle at whatever angle or attitude the vehicle strikes the barrier.

It is an additional object of the present invention to provide improved deceleration barriers for vehicles which are effective to "catch" the vehicle without substantial deflection of the vehicle while simultaneously eliminating the so-called ramp or lifting effects.

It is also an object of the present invention to provide improved deceleration barriers which are of relatively uncomplicated mechanical construction and which can be manufactured and sold and erected at a cost which permits their use as sacrificial units.

In attaining these and other objects, the present invention provides an array of sacrificial barrier units comprising weights spaced and arranged to suit the requirements of a particular installation. Preferably, the individual weights are light, breakable containers the upper portion of which contains a dispersible mass such as sand or water and the lower portion of which is of light-weight crushable construction to prevent a ramp effect which would project the vehicle upwards or give it an overturning vertical acceleration. Thus, the center of gravity of the individual weights is preferably at least as high as that of the average vehicle (about 22 inches) which permits the weights to impart a horizontal or overturning-resisting force on the vehicle at whatever attitude or angle the vehicle strikes the weight. Each weight may be connected to the other weights by a cable system with the cables being so arranged as to "catch" the vehicle in such a manner to prevent the vehicle from proceeding over or nosing under the cable and to prevent injury to the occupants of the vehicle by the cables.

The individual weights preferably comprise sand filled frangible plastic containers which are of relatively inexpensive, knockdown construction. The containers may be easily transported to the site, erected, filled with a dispersible mass and covered or sealed. Since they are not anchored and require little or no site preparation, their installation or replacement may be accomplished at minimum cost.

DESCRIPTION OF PREFERRED EMBODIMENT

Figure 1:
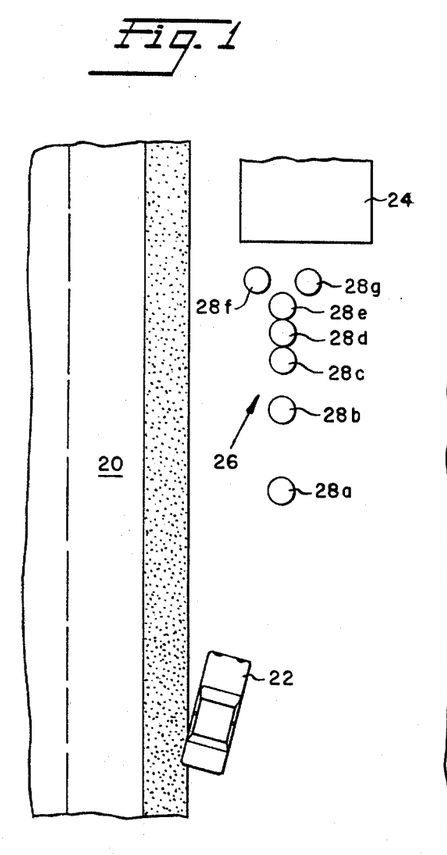
FIG. 1 is a diagrammatic top plan view of the barrier in accordance with the present invention shown in its normal initially installed configuration.

Referring now more particularly to the drawings the barrier system of the present invention is illustrated in FIG. 1 in a typical application, i.e., adjacent the highway 20 in position to intercept and decelerate a vehicle 22 travelling toward a fixed obstruction 24. The barrier system, indicated generally at 26, comprises a series of individual units 28a through 28g which will be described in detail below. The number, arrangement and mass of the individual units may be varied as required to meet the requirements of a particular installation. In general, the use of a relatively large number of small units is to be preferred since such a system is in effect a variable capacity device. For example, a relatively light vehicle travelling at relatively slow speed will engage or displace perhaps only two or three of the units and the consequences of the impact between the vehicle and the units will be minimized. A larger vehicle or a vehicle travelling at a high speed may engage and displace all of the units. Since the engagement is sequential the adverse consequences of an impact against any particular unit is again minimized.

The individual units may take a variety of forms. In general they comprise a light, breakable container filled with a dispersible mass such as sand and are so constructed as to dispose their center of gravity at least at the level of the center of gravity of the vehicle. Preferably the units are of cylindrical form, this form being preferred to simplify manufacture and assure low cost and to minimize damage to the vehicle upon impact. Typically, they are from 20 to 40" in diameter and 24 to 36" high to perform their dynamic function in a practical form. A presently preferred form of the individual units is shown in FIGS. 2–6 to which detailed reference will now be made.

The containers comprise an essential cylindrical body 30, a lid 32 and a base or core assembly 34. Preferably, for ease of manufacture, the body 30 comprises identical halves 36 and 38 secured together as by rivets 40. When the two halves are secured together they form a cylinder open at the top and bottom. While there are many materials suitable for the fabrication of the container body, a structrual foam plastic manufactured by Union Carbide Corporation has proved to be particularly well suited to this purpose. This material has a density of approximately 45 lbs. per cubic foot and a tensile strength of 1000 lbs. per square inch. Such a material is durable and weather resistant and yet upon heavy impact breaks into relatively small pieces which in themselves do not constitute a secondary hazard. To increase the frangibility of the body, it is provided with a series of spiral indentations 42 which, in effect, constitute break lines.

The cover 32 is a single piece of high density polyethylene. The cover and the body are provided with a mating snap lock tongue and groove construction 44 which provides an effective moisture seal and minimizes the possibility of unauthorized removal of the cover. The core 34 is preferably formed of a rigid polyurethane foam having a density of approximately two lbs. per cubic foot. To reduce the density of the core and to increase its crushability it is provided with several voids 46. It will be understood that other materials may also be used for the core it being necessary only that the core be crushable, of low density, and of sufficient rigidity to support the contents of the container.

Figure 2:
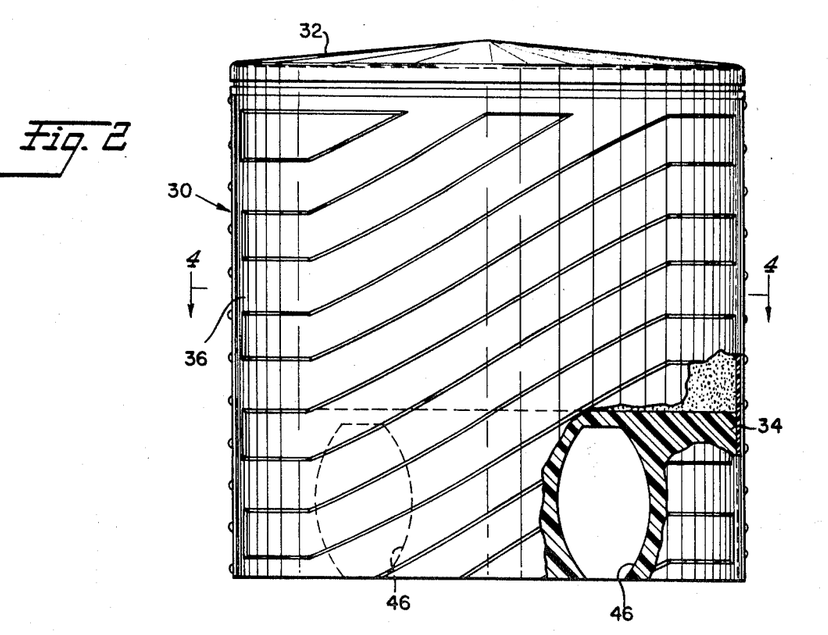
FIGS. 2 and 3 are side elevations taken 90° apart of one form of the individual barrier units.
Figure 3:
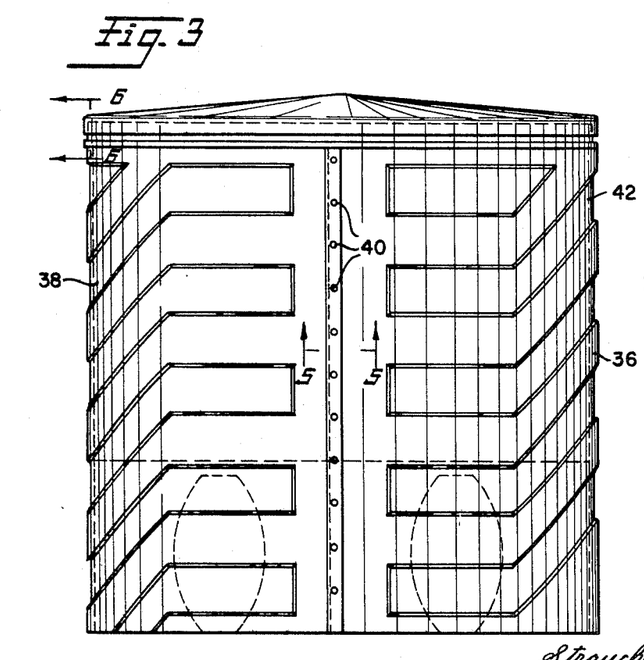
Figure 4:
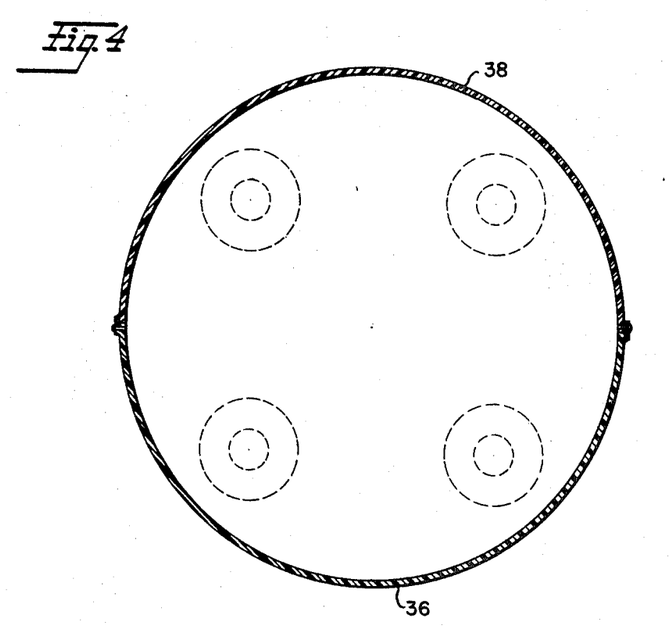
FIG. 4 is a transverse section taken along line 4—4 of FIG. 2.
Figure 5:
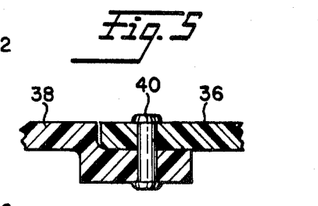
FIGS. 5 and 6 are fragmentary enlarged sections taken along lines 5—5 and 6—6 of FIG. 3 showing details of construction of the containers.
Figure 6:
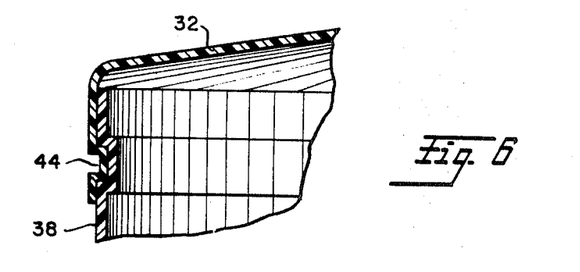

In the interests of standardization it is contemplated that the containers will be provided in a minimum number of basic sizes and it is believed that two such sizes will suffice for presently existing requirements. For example in one basic size the container may have a diameter of approximately 36" and a height of approximately 31". The overall weight of the unit can be varied either by varying the extent to which the space above the core 34 is filled with sand or by varying the height of the filler core. For example, if the height of the core is 17" the weight of the container, when filled with sand, will be approximately 800 lbs. The weight of the unit may be reduced by partial filling to about 400 lbs. The weight may be increased to about 1000 lbs. by reducing the height of the core to 12". Conveniently, the containers can be made larger simply by elongating the body 30. In a specific case a 1400 lb. barrier unit may be produced by increasing the overall height of the body to approximately 36", by using a 12" core and filling the space above the core fully with sand. In all cases it will be noted that the center of gravity of the barrier is well above its vertical midpoint. It is usually just below the vertical midpoint of the material in the space above the core. It is important that the center of gravity of the unit be disposed essentially at the same level as the center of gravity of the impacting vehicle to avoid imparting vertical acceleration to the vehicle. In the average passenger car the center of gravity is approximately 22" above the supporting roadway.

Dry sand is a preferred filler for the container since it has relatively high mass per unit volume and is readily available at low cost. It has many of the characteristics of a fluid and it may be dispersed with minimal damage to the colliding vehicle or to other adjacent vehicles. The sealed cover 32 keeps the sand essentially moisture free so that it will not freeze and become a solid mass in the winter time.

Figure 15:
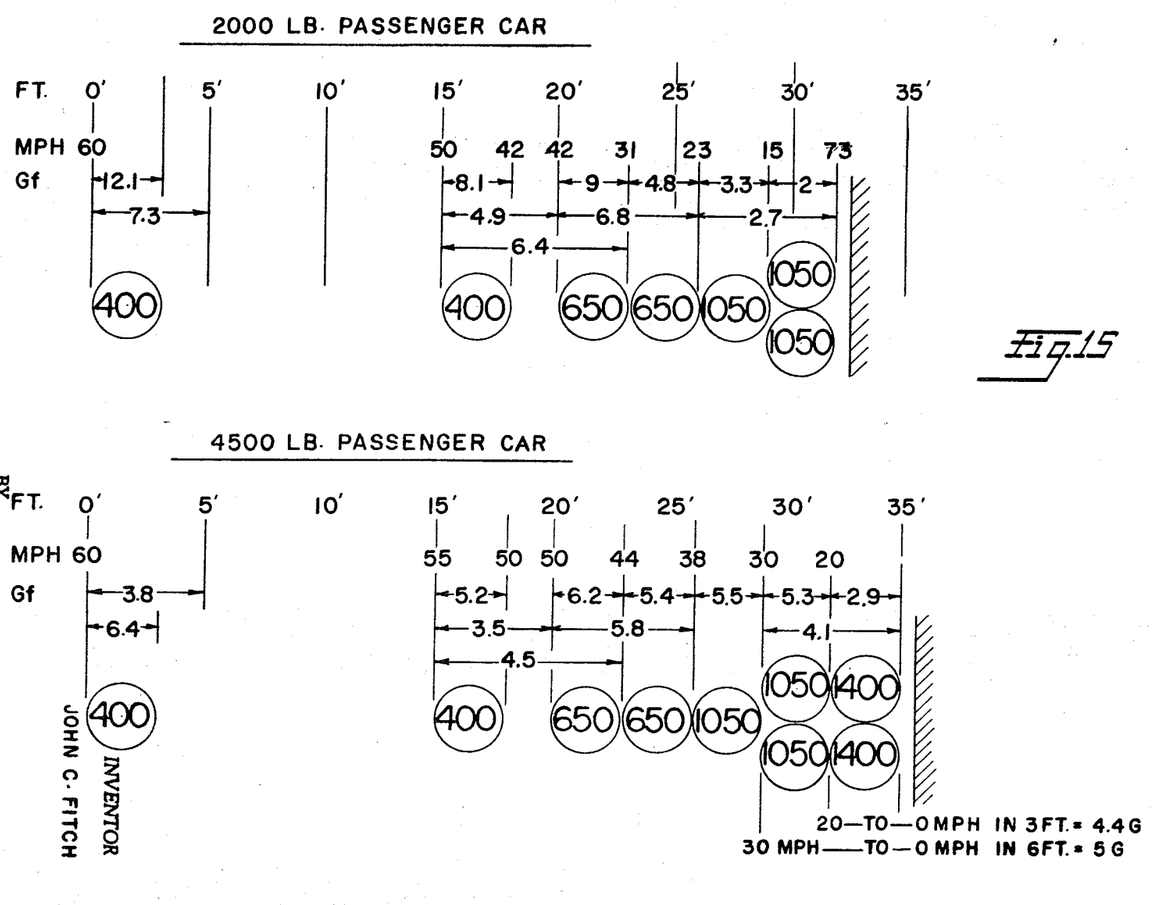
FIG. 15 illustrates graphically a specific array of units and performance data.
Figure 16:
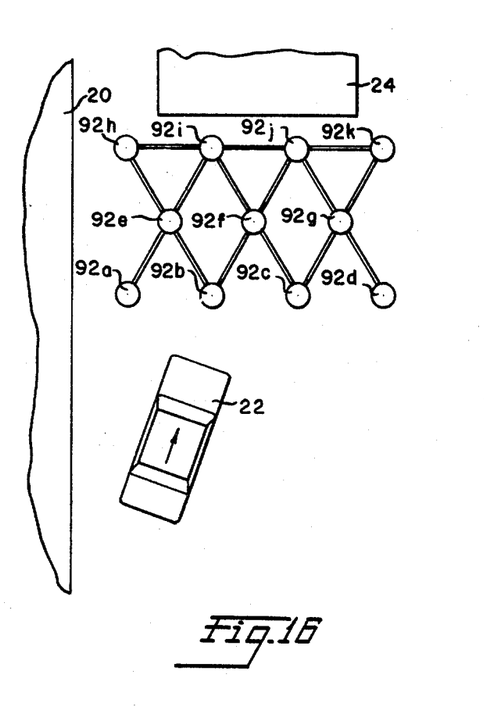
FIG. 16 is a diagrammatic top plan view of another embodiment of the barrier in its normal initially installed configuration.

At the time of installation of the barrier system, a supply of container bodies, lids and cores and a supply of sand is trucked to the desired site. The container bodies are then arranged in the desired pattern. Since they are of light-weight construction they may be set in place manually without difficulty. Little or no site preparation is required since the units are not anchored to the ground and since they impose a load on the supporting surface of not more than approximately 2 lbs. per square inch the available surface is adequate for support. After the container bodies are suitably arranged, the cores are slipped in place, the space above the cores is filled to the desired level with sand and the lids are snapped in place. The number, size and disposition of the weights depends on the anticipated speeds and weight of the vehicles travelling along the adjacent highway and are thus subject to some variations. A typical array of weights shown diagrammatically in FIG. 1 and graphically in FIG. 15 is intended for installation in front of a fixed abutment adjacent a highway along which passenger cars are expected to travel at the usual highway speeds.

The barrier system of the present invention comprises a number of individual units rather than a single unit for several reasons. A relatively minor consideration is the ease of manufacturing, shipping and handling the smaller units.

Of much greater importance is the flexibility permitted in arranging the units and particularly to impart to the barrier system the capability of functioning as a variable capacity device. It is to be understood that the depth of penetration of the vehicle into the barrier system before it is brought to rest depends upon the initial engagement speed of the vehicle and its weight. The braking effort exerted by the driver of the vehicle can be ignored for all practical purposes. In all cases regardless of the direction of the vehicle it will engage and displace the units sequentially and only a predetermined unit at any one time is instantaneously accelerated to the vehicle speed thus causing a slow controlled vehicle deceleration with minimum damage to the vehicle and with minimum risk to the vehicle occupants.

Two phenomena are involved when a vehicle is stopped by the barrier system. Initially, the deceleration of the vehicle occurs because of a transfer of momentum from the vehicle to the barrier. In the final portion of the deceleration, the frictional forces become predominant. High speed photography has established that when a vehicle travelling at highway speed strikes the first unit, the unit virtually explodes. A fan of sand is thrown out from the vehicle primarily in a plane normal to the vehicle with the sand being instantaneously accelerated to approximately the vehicle speed. Since the vehicle thereafter decelerates rapidly, the sand fans out ahead of the vehicle and falls to the ground thereby dissipating its acquired energy through air resistance and sliding friction. This action continues with decreasing vigor until the vehicle no longer strikes the units with sufficient speed to throw the sand into the air. The vehicle then begins to push the remaining sand as a homogeneous unit dissipating energy directly as friction until both the vehicle and the barrier come to rest. Thus the inertia of the sand is utilized at high speeds as a decelerating agent while at the low speeds the weight and the internal and surface friction of the sand mass becomes predominant.

It is now well known that most injuries are caused by the "second collision" which occurs when the occupant strikes the interior of the vehicle after the vehicle strikes an object.

In the illustrated embodiment it will be noted that a relatively light unit 28a is disposed a considerable distance from the remainder of the weights to form a gap in the barrier. The size and placement of this unit is selected to decelerate the vehicle at a rate sufficient to create artificially the "second collision" with $g$ forces which can be tolerated by the vehicle occupant. Thus, by the time the vehicle strikes the second unit, 28b, the occupants are solidly supported by the internal vehicle structure under which condition they can tolerate high rates of deceleration. The greater the spacing between the first and second units, the less is the relative speed between the occupant and the vehicle required to reposition the occupant against the interior of the vehicle before the vehicle reaches the remainder of the barrier. Space restrictions, however, usually limit the spacing to about 15 ft. Depending upon the assumption as to initial impact speed and the distance traversed inside the car, the initial speed reduction must be about 10 m.p.h. and the initial barrier mass must be about four to five hundred lbs.

As the vehicle progresses through the barrier, it continues to strike the individual units in a series of impacts. In the initially contacted portion of the barrier system, the deceleration of the vehicle is a function of the amount of mass impacted per foot of travel. After each impact the sand involved in that impact is displaced out of the area of impact and continues at its own post-impact velocity while the vehicle is slowed further by succeeding impacts.

The friction effects are those which occur when the vehicle stops throwing sand and begins pushing it. When the vehicle acts as a bulldozer against the mass supported by the ground, energy is lost directly to friction between the mass and the ground. Motion pictures of impacts indicate that this transition from inertial to frictional behavior occurs at around 20 m.p.h. At speeds below 20 m.p.h. the deceleration is due primarily to the friction effects.

The unique concept of utilizing unanchored frangible individual units, together with multiple impact deceleration permits the barrier system of the present invention to safely decelerate vehicles of widely different initial momentum as graphically shown in FIG. 15. As far as is known no prior barrier system which is practical for general highway use is effective to decelerate a heavy automobile at a safe rate without decelerating a lighter or more rapidly travelling vehicle at a dangerously high rate.

Once the basic concepts are fully appreciated, the particular configuration of the array lends itself to routine mathematical analysis.

If it is assumed that all of the mass of the barrier is in one unit and if it is further assumed that the collision is inelastic the reduction of vehicle speed during a single impact will be the ratio of the weight of the barrier to the weight of the vehicle. However, for a large barrier extending several yards ahead of the vehicle the collision occurs as a series of impacts rather than as a single impact. For purposes of analysis the barrier may be considered to be divided into an infinite number of infinitesimal small portions. From this the following relationship can be derived:

$$\frac{V_o}{V_f} = L_n - 1 \frac{M_b}{M_v}$$

where:

$V_o$ = initial or original velocity $V_f$ = final velocity due to multiple successive impacts
$L_n - 1$ = "the quantity whose natural logarithim is"
$M_b$ = mass of barrier or sand weight
$M_v$ = mass of vehicle or car weight If it is assumed that it is desired to decelerate a 2000 lb. vehicle from 60 m.p.h. to 0 m.p.h. and minimize the second collision, the barrier configuration is derived by first determining the total weight of the dispersible mass in the barrier system. The foregoing equation yields a figure of 5250 lbs. Next the weight of the dispersible mass in the initial unit to achieve a 10 m.p.h. reduction in speed must be determined. Using the same equation we arrive at a figure of about 400 lbs.

The size of the gap to permit the second collision to occur before the vehicle strikes the main barrier array can be determined by calculating the distance the vehicle travels at 60 m.p.h. while the occupants travel a distance of approximately 2 ft. at 10 m.p.h. In a typical case the gap should be about 12–15 ft. The length of the array of barrier units, excluding the first unit, assuming an initial speed of 60 m.p.h. and a deceleration well within the range of human tolerance, will be about 18 ft.

The size of the individual units can then be determined. To maintain deceleration at relatively constant g's the units will be of increasing size ranging from about 400 lbs. for the second unit to about 1000 lbs. for the eighth unit. Additional units which may be considerably larger, i.e., 1400 lbs. each may be added as a safety factor thus conforming with the presently preferred form previously referred to in column 4, lines 11–22.

It will be noted from FIG. 15 that the array of weights shown will safely decelerate a 2000 lb. passenger car from a speed of 60 m.p.h. with a short duration, maximum g force on the vehicle of slightly over 12 and the same array will decelerate a 3500 lb. passenger car with a maximum g force of 6.2, both rates being within the range of human tolerance without the expectation of significant injury.

Actual tests have demonstrated conclusively that the barrier system of the present invention provides for deceleration of the vehicle and its occupants by means outside the vehicle in a survivable time-distance range with or without the use of seat belts although, as in most emergency situations, the use of seat belts affords a significant added safety factor. The barrier system dramatically reduces the second collision problem by inducing a minimal speed reduction prior to the second collision after which human tolerance of high g forces is greatly increased. It has also been established that the barrier system will operate equally well on vehicles colliding at any attitude, including broadside.

A secondary, but not insignificant advantage, from the use of sand as the dispersible mass, is the substantial reduction in fire hazard. It is usually found after an arrestment that the engine compartment is liberally covered with sand which effectively inhibits the creation or maintenance of fires.

Another factor of critical importance to the successful function of the barrier system is the construction of the individual units in such a manner that they do not create a ramp effect. In most, if not all prior barrier systems, the vehicle is given a strong vertical or other undesirable acceleration perpendicular to the line of travel. As a result the vehicle often passes over the barrier with little or no loss of forward speed, is violently deflected or is overturned.

Because of the unique construction of the individual barrier units of the present invention the center of gravity of the units is located at or above the height of the center of gravity of the impacting vehicle thus eliminating entirely the ramp effect. Similarly, if the vehicle approaches the barrier system broadside it will not be tripped or overturned.

Figures 7, 8, 9, 10:
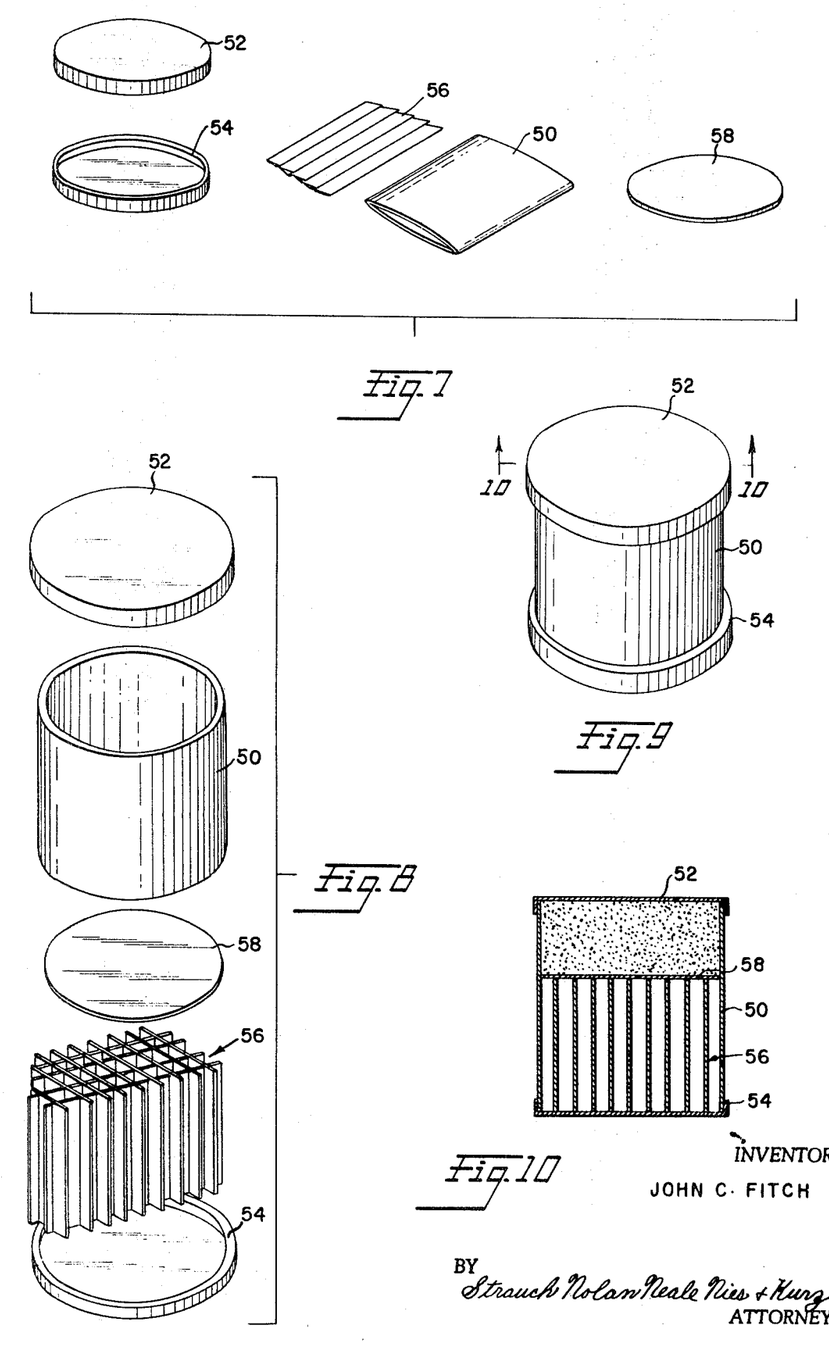
FIG. 7 is a perspective view illustrating the components of a knockdown container.
FIG. 8 is an exploded view of the container of FIG. 7 shown partially erected.
FIG. 9 is a perspective view of the container components of FIGS. 7 and 8 shown erected and installed.
FIG. 10 is a vertical section taken along line 10—10 of FIG. 9.

FIGS. 7–10, to which detailed reference will now be made, illustrate a modified form of container specifically developed to be shipped and stored in minimum space. The container comprises a body member 50, top and bottom covers 52 and 54, a core assembly 56, and a divider plate 58. All of these parts may be fabricated from any suitable material, such as plastic or treated paper, having the requisite weather resistance and sufficient strength to support the static loads imposed on them yet having low resistance to breakage on impact. At least the main body member 50 must be of flexible material or suitably hinged to permit it to be folded flat as shown in FIG. 7. Similarly, the core assembly 56 is preferably constructed of a number of separate sheets and is of the so called egg crate construction so that it may also be folded substantially flat as shown in FIG. 7.

The unit may be erected by first positioning the bottom cover member 54, inserting the body member 50 into the bottom cover member after forming it to cylindrical shape, then erecting the core assembly 56 and installing it within the body. The divider plate 58 is then installed, the space above the divider filled with sand and the assembly is completed by installation of the top cover member 52.

Since the entire unit is frangible, the core assembly is of light weight and crushable construction and the center of gravity of unit is artificially elevated, its function is the same as that of the barrier described above.

Figure 11:
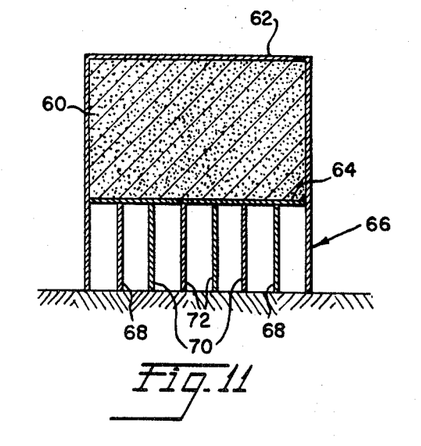
FIG. 11 is a vertical section illustrating a slightly modified container.

The barrier unit illustrated in FIG. 11 is essentially of the same construction and comprises a body member 60, a removable cover 62, a transverse floor member 64, and a low density crushable base assembly 66. In this form of the invention the base assembly comprises a series of concentric light-weight tubes 68, 70 and 72. Typically the base section is approximately 12 inches high and the height of the upper container section is 18 inches making an overall height of about 30 inches.

Figure 12:
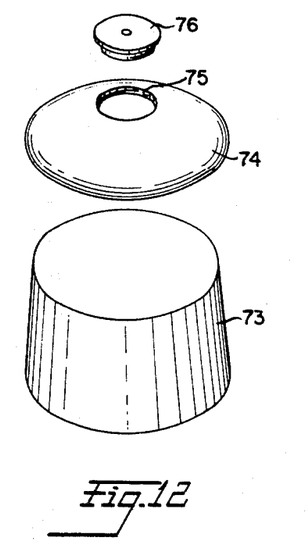
FIG. 12 is an exploded view showing the components of another form of container.
Figure 13:
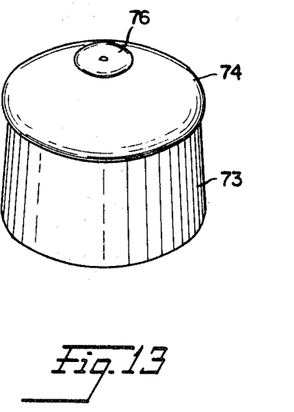
FIG. 13 is a perspective view showing the components of FIG. 12 assembled and installed.

For esthetic reasons it may be desirable in some cases to depart from the purely functional barrier unit configuration discused above. FIGS. 12 and 13 disclose a form of barrier unit comprising a hollow light-weight crushable base or pedestal section 73 the upper end of which is adapted to receive a container 74 which is circular in top plan view and ovate in section. As before, the container is adapted to hold a dispersible mass such as sand. The top filler opening 75 may be closed with a removable cover member 76. The components of the barrier unit are preferably fabricated from light-weight, low cost plastic.

Figure 14:
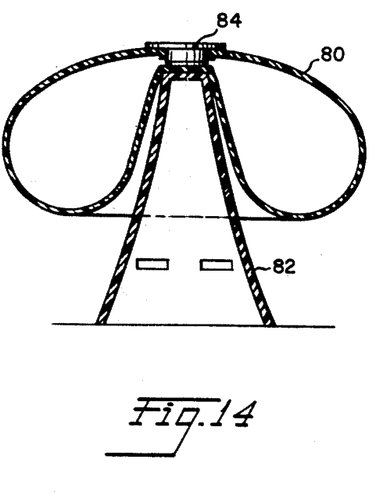
FIG. 14 illustrates a further modification of one of the individual units.

In the embodiment of the invention shown in FIG. 14 the dispersible mass, such as sand, is contained within a flexible bag 80 preferably fabricated from plastic, the bottom central portion of the bag being supported on a light-weight crushable pedestal 82, and the container 80 is preferably selectively closed by a removable cover plate 84.

The functional advantage of the types shown in 12, 13 and 14 lies in the fact that the mass retention (the sand) is contained by tension forces only acting on the container skin.

The individual barrier units shown in FIGS. 12, 13 and 14 are functionally the same as the units described above.

FIGS. 16, 17, 18 and 19 illustrate a modification of the barrier system of the present invention in which the individual barrier units are interconnected in a unique manner by a cable system comprising a series of dual cable assembles each indicated at 90. The individual units 92a–92k are preferably of cylindrical form as illustrated in FIGS. 2–11.

Figure 18:
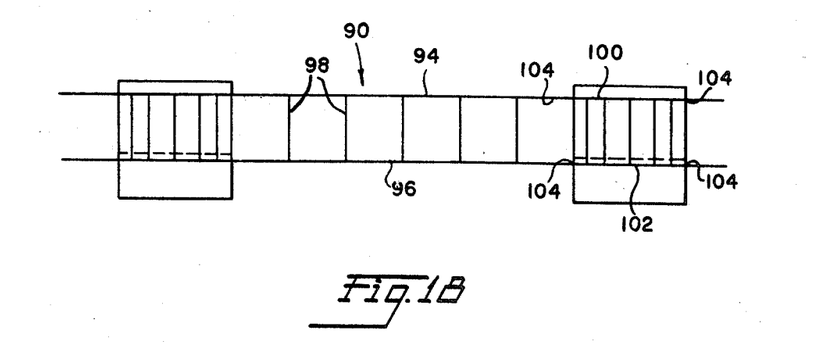
FIG. 18 is an enlarged view showing a pair of interconnected units incorporated in the barrier system of FIGS. 16 and 17.

As best shown in FIG. 18 the cable system comprises upper and lower cables 94 and 96 connected at suitable intervals by vertical strands 98. At their opposite ends the upper and lower cables 94 and 96 are attached to cable loops 100 and 102 which encircle the container and base respectively, the loops being held at the proper height by a series of projections 104 provided in the wall of the base and container. Typically the upper cable 94 will be at an elevation of approximately 26 inches above ground and the lower cable 96 at an elevation of some 10 inches. The cables may be of light-weight steel or nylon having sufficient tensile strength. Nylon is preferred for some installations since it is essentially weatherproof, and, because of its stretchability, functions as an energy absorber.

In use, the containers are first arranged in the desired pattern. The cable lengths 90 are then connected and the individual containers are filled with sand. Then final adjustments are made to assure that the individual cable lengths will be in light tension to minimize the stress on the cables, the containers and the vehicle upon impact.

Figure 17:
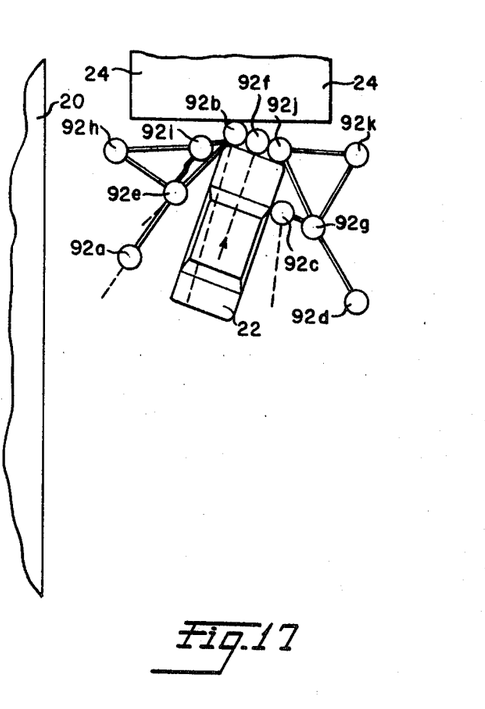
FIG. 17 is a view similar to FIG. 16 but illustrating the configuration of the barrier system after it has been struck by a vehicle.

A typical impact situation is illustrated in FIG. 17. In the case illustrated the vehicle 22 has left the highway 20 in the direction of a fixed object 24. The vehicle first contacts the unit 92b which decelerates the vehicle to a certain extent with minimum damage to the vehicle. The vehicle then continues on its course until it reaches unit 92f which it displaces toward unit 92j. Immediately upon displacement of the unit 92f the unit 92c is also displaced, although the rate of acceleration of the unit 92c will be initially less than that of the unit 92f because of the cable geometry. Thus, the cumulative deceleration of the vehicle continues with ultimate displacement of the units 92a and 92j.

As noted above, the depth of penetration of the vehicle into the barrier system before it is brought to rest depends on the initial engagement speed of the vehicle, and its weight. But in all cases, regardless of the direction of the vehicle, it will engage and displace the barrier units in a predetermined sequence thus providing the desired slow controlled vehicle deceleration.

The cable arrangement assists in preventing the ramp effect since the lower cable is so located as to "catch" any vehicle below the wheel centerline and the vehicle center of gravity, and the upper cable is located to intercept the vehicle above the wheel center and the center of gravity and above the bumper or body nose. As a result the vehicle is positively intercepted by the cable system and the vehicle has no tendency to rise above the system. A double cable system also insures that cables cannot slip over the nose or hood of an average vehicle which could result in injury to the vehicle occupants.

Figure 19:
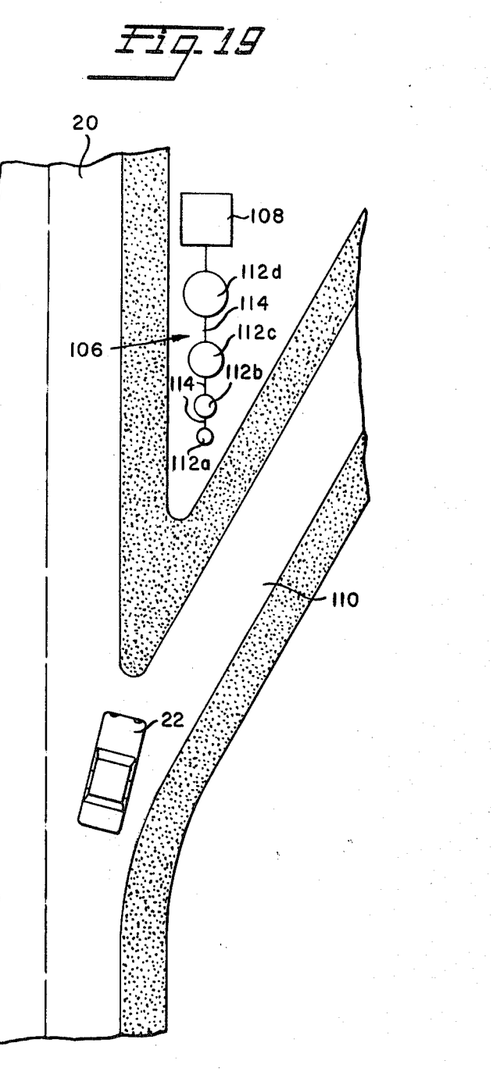
FIG. 19 is a view similar to FIG. 16 but showing a modified application of the barrier system of the present invention.

FIG. 19 illustrates another typical application of the invention.

In this case the array of barrier units, indicated generally at 106, if positioned in front of a fixed object 108 such as a large structural support at a "gore," i.e., the point where an exit ramp 110 leaves the main highway 20. It frequently happens that when a vehicle approaches the gore the driver is undecided about which lane to use and, because of this, or because of a sudden change of mind, enters the area between the main highway and the exit ramp. For many reasons it is not always feasible to avoid entirely the use of fixed objects in this area.

In such a situation it has been found that the vehicle may be protected by arranging the series of units 112a, b, c, and d in essentially straight-line fashion in front of the fixed object 108. The individual units are of the same construction as the units described above and they are interconnected by the same type of cable system indicated generally at 114. Preferably, however, the size and mass of the individual units in this barrier system is increased as they approach the fixed object in order to increase the rate of deceleration of the vehicles as they approach the object.

Such an arrangement also has the advantage that a maximum free space is provided in the approaches to the object while providing, in the region closely adjacent to the fixed object, mass of sufficient size to provide full protection for the vehicle and its occupants.

From the foregoing it will be apparent that the above-stated objects and advantages of the invention have been obtained by the provision of a safety barrier for decelerating vehicles by means independent of the vehicle in a survivable time-distance range whether or not the occupants are provided with seat belts. The barrier system permits utilization of all the distance which is available in a given hazardous fixed object site making it possible to bring the vehicle to a safe stop with little or no injury to passengers and minor damage to the vehicle.

The barrier system of the present invention drastically reduces the second collision problem by inducing a minimal speed reduction to create the second collision under controlled conditions after which human tolerance to higher $g$ forces is greatly increased. The deceleration of the vehicle is not accompanied by the production of secondary hazards particularly in the form of still integral flying masses.

Most important, the barrier mass is so arranged so that no passenger car, however shaped or constructed, can climb over or nose under the barrier.

The barrier system of the present invention has another significant advantage over known prior systems, namely, its low cost. The cost of installation of the barrier system of the present invention is nominal as compared to the costs of other highway safety devices. For example, the cost of materials used in a test installation of typical dimensions is under $1000.

The special containers used as the individual barrier units are shipped directly to the highway maintenance depot nearest the erection site. Special tools and equipment are not required for their installation, the only requirement being that the area on which the array is to be placed is reasonably level. The maintenance crew merely places the containers in position according to the pre-engineered diagram for each site and fills them with sand to the level called for. After collision, the damaged barrier units are replaced and can be refilled with the original sand, supplemented as required.

What is claimed and desired to be secured by Letters Patent is:

1. Sacrificial inertial barrier apparatus for decelerating a vehicle as it approaches a hazardous area comprising at least one frangible barrier unit adapted to be positioned in the path of said vehicle in a manner to be substantially freely displaceable upon impact by said vehicle, at least the upper portion of said unit comprising a dispersible mass of predetermined density and said unit having a lower light weight collapsible support portion, the density of said lower support portion being appreciably below said predetermined density, the mass and density of said upper portion of said unit being so related to the mass and density of said lower support portion as to dispose the center of gravity of said barrier units substantially at the level of the center of gravity of said vehicle whereby upon impact the inertia of the dispersible mass decelerates the vehicle without imparting a substantial vertical moment to the vehicle.

2. The apparatus according to claim 1 wherein said units are held in position on a supporting surface solely by their weight.

3. The barrier apparatus according to claim 1, wherein said barrier unit is essentially cylindrical, and its axis is essentially vertical.

4. Apparatus for decelerating a vehicle as it approaches a hazardous area comprising a series of individual barrier units adapted to be arranged on a surface adjacent to said area, said units being freely moveable on said surface and displaceable upon impact by said vehicle, each of said units comprising a frangible container at least partially filled with a dispersible mass, the center of gravity of each of said units being disposed above its vertical midpoint, a first series of flexible connectors interconnecting the upper portions of said units, a second series of flexible connectors interconnecting the lower portions of said units, and a third series of flexible connectors interconnecting said first and second series of connectors.

5. The apparatus according to claim 4 wherein said units are disposed between a roadway and a fixed abutment, said units extending away from said abutment in an essentially straight line and the mass of said units progressively decreasing in a direction away from said abutment.

6. The apparatus according to claim 4 wherein said units are arranged in a group comprising a series of rows in front of a fixed hazard the width of said group in a direction transverse to the path of said vehicle being greater than the width of said vehicle whereby said vehicle will initially contact and displace only certain units, other of said units being progressively displaced upon movement of said vehicle into said group to thereby decelerate said vehicle at a controlled rate as it approaches said hazard.

7. The apparatus according to claim 4 wherein said units are arranged in a group adjacent to a fixed abutment to intercept a vehicle travelling toward the abutment, said units being of generally decreasing mass in a direction away from said abutment there being a substantial space between the unit most remote from said abutment and the next adjacent unit.

8. Sacrificial inertial barrier apparatus for decelerating a vehicle as it approaches a hazardous area comprising a plurality of individual frangible barrier units adapted to be positioned in the path of said vehicle in a manner to be substantially freely displaceable upon impact by said vehicle, at least the upper portion of said units comprising a dispersible mass of predetermined density and said units having a lower light weight collapsible support portion, the density of said lower support portion being appreciably below said predetermined density, the mass and density of said upper portion of said units being so related to the mass and density of said lower support portion, as to dispose the center of gravity of said barrier units substantially at the level of the center of gravity of said vehicle whereby upon impact, the inertia of the dispersible mass decelerates the vehicle without imparting a substantial vertical moment to the vehicle, and said units being arranged in a pattern of increasing mass in the direction of movement of said vehicle.

9. The barrier apparatus according to claim 8 wherein said units are arranged in a group adjacent to a fixed abutment to intercept the vehicle traveling toward the abutment, the ones of said units adjacent to said abutment being closely adjacent to each other and there being a substantial space between the unit most remote from said abutment and the next adjacent unit.

References Cited

UNITED STATES PATENTS

| | | | |
|---|---|---|---|
| 1,808,767 | 6/1931 | DeGloria et al. | 256—1 |
| 1,926,131 | 9/1933 | Wilde | 256—1 |
| 2,088,087 | 7/1937 | Hudson | 256—1 |
| 3,141,655 | 7/1964 | Platt | 256—13.1X |
| 3,288,440 | 11/1966 | Schimmelpenninck et al. | 256—13.1 |

FOREIGN PATENTS

| | | | |
|---|---|---|---|
| 766,944 | 1/1957 | Great Britain | 256—13.1 |
| 1,293,615 | 4/1962 | France | 94—1.5 |

DENNIS L. TAYLOR, Primary Examiner

U.S. Cl. X.R.

94—1.5